US008398004B2

(12) United States Patent
Harms

(10) Patent No.: US 8,398,004 B2
(45) Date of Patent: Mar. 19, 2013

(54) HYDRAULIC DRIVE SYSTEM FOR SAND AND SALT SPREADERS

(75) Inventor: Louis C. Harms, Evanston, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 327 days.

(21) Appl. No.: 12/885,094

(22) Filed: Sep. 17, 2010

(65) Prior Publication Data

US 2011/0067391 A1 Mar. 24, 2011

Related U.S. Application Data

(60) Provisional application No. 61/243,508, filed on Sep. 17, 2009.

(51) Int. Cl.
*A01C 15/04* (2006.01)

(52) U.S. Cl. ............................ 239/654; 239/683; 239/7

(58) Field of Classification Search .............. 239/7, 650, 239/654, 658, 659, 660, 676, 683, 124
See application file for complete search history.

(56) References Cited

U.S. PATENT DOCUMENTS

| | | | | |
|---|---|---|---|---|
| 5,090,626 | A * | 2/1992 | Platsch | 239/654 |
| RE33,835 | E | 3/1992 | Kime et al. | |
| 5,318,226 | A | 6/1994 | Kime et al. | |
| 5,725,160 | A * | 3/1998 | Harper et al. | 239/654 |
| 6,027,052 | A * | 2/2000 | Strieker et al. | 239/654 |
| 6,286,535 | B1 | 9/2001 | Harms et al. | |
| 6,405,746 | B2 | 6/2002 | Harms et al. | |
| 6,446,879 | B1 | 9/2002 | Kime | |
| 6,481,463 | B1 | 11/2002 | Harms | |
| 2005/0204587 | A1 | 9/2005 | Kime | |
| 2006/0255189 | A1 | 11/2006 | Niemela et al. | |
| 2007/0151237 | A1 | 7/2007 | Hacker | |
| 2008/0201994 | A1 | 8/2008 | Crago | |

OTHER PUBLICATIONS

Installation and Operating Instruction Manual, MDV Series, Swenson Spreader, Part No. 00115-147-01 Rev. c, Jul. 7, 2004, 26 pages.

* cited by examiner

*Primary Examiner* — Davis Hwu

(74) *Attorney, Agent, or Firm* — Renner, Otto, Boisselle & Sklar, LLP

(57) ABSTRACT

A hydraulic drive system for a spreader used to distribute a road surface treatment material, such as sand or salt, across a road surface. The hydraulic drive system enables the use of pressure-compensated proportional control valves in series relationship with the auger and spinner motors, by the provision of small restricted flow passages across the outlets of the valves.

20 Claims, 3 Drawing Sheets

HYDRAULIC DRIVE SYSTEM FOR SAND AND SALT SPREADERS

RELATED APPLICATIONS

This application claims the benefit of U.S. Provisional Application No. 61/243,508 filed Sep. 17, 2009, which is hereby incorporated herein by reference.

FIELD OF INVENTION

The present invention relates to hydraulic drive systems for spreaders used to distribute a road surface treatment material, such as sand or salt, across a road surface.

BACKGROUND

Hydraulic drive systems have been used to drive a feed auger and spinner of a spreader typically carried by a vehicle for spreading a road surface treatment material, such as sand or salt, across a road being traversed by the vehicle. The feed auger delivers the road surface treatment material from a supply thereof, such as a hopper, to the spinner which distributes the material across a road surface.

Many of these systems are designed as self-contained units that can be mounted in the bed of a pickup dump truck. Pressurized hydraulic fluid is supplied by a hydraulic pump typically driven by a gasoline engine. Cab-mounted, manually operated hydraulic flow control valves have been used to adjust the rotary speeds of the material conveyor (auger) and spinner fan (spinner).

Electrically-operated hydraulic valves have been used for spreading applications. These systems have used a parallel type flow configuration for supplying hydraulic fluid to the hydraulic motors that drive the auger and spinner. These systems require relatively large pumps to supply adequate flow to the auger and spinner motors.

U.S. Patent Application Publication No. 2005/0204587 discloses a microprocessor-controlled hydraulic system for snow-ice removal trucks that uses digital hydraulic valving control responsive to the instantaneous speed of the truck. According to this document, a binary form of digital valving removes a requirement for vulnerable feedback lines and associated sensors. As disclosed, the hydraulic motors for driving the auger and spinner are serially connected. The valves are either in an open position or a closed position depending on the desired amount of hydraulic flow. When no hydraulic pressure is to be supplied to the auger and/or spinner motors, i.e. when the digital control valves are all closed, hydraulic flow is routed back to reservoir by a bypass valve. When the bypass valve is open, pressure cannot buildup at the inlets to the auger and spinner motors.

SUMMARY OF INVENTION

The present invention provides a hydraulic drive system for a spreader used to distribute a road surface treatment material, such as sand or salt, across a road surface. The hydraulic drive system enables the use of pressure-compensated proportional control valves in series relationship with the auger and spinner motors, and thus eliminates the need for digital valving equipped with a bypass valve that prevents pressure buildup in the system when hydraulic fluid is not being supplied to the auger motor and/or spinner motor.

A preferred embodiment of the invention is characterized by the use of a lower cost and smaller displacement hydraulic pump that enables installation in the engine compartment of a vehicle so it can be driven by the engine's fan belt. This eliminates the need for and cost of a gasoline-powered auxiliary engine, as well as the associated noise, pollution, and maintenance requirements. The hydraulic pump need only be sized to provide hydraulic flow satisfying the larger of the flow requirements for the auger and spinner motors, rather than the sum of the requirements as in the case of parallel systems.

More particularly, a hydraulic system for operating the feed auger and spinner of a spreader includes first and second fluid motors for driving the feed auger and spinner. The fluid motors are connected in series with one another and first and second solenoid-operated pressure-compensated proportional control valves each including a pressure compensating spool. The first valve has an inlet configured to receive pressurized fluid from a source thereof such as an engine compartment mounted hydraulic pump, a regulated flow outlet connected to the inlet of the first fluid motor, and a bypass flow outlet, whereby operation of the valve controls the volume of flow of pressurized fluid supplied to the inlet of the first fluid motor via the regulated flow outlet with the balance of flow bypassing the first fluid motor. The second valve has an inlet connected to the outlet of the first fluid motor and the bypass flow outlet of the first valve, a regulated flow outlet connected to the inlet of the second fluid motor, and a bypass flow outlet, whereby operation of the second valve controls the volume of flow of pressurized fluid supplied to the inlet of the second fluid motor via the regulated flow outlet of the second valve with the balance of flow bypassing the second fluid motor. The system additionally includes first and second pressure-relieving restricted flow passages respectively connected between the regulated flow outlets and bypass flow outlets of the first and second valves for preventing pressure buildup at the regulated flow outlets of the first and second valves, thereby to assure proper operation of the compensator spools of the first and second valves.

In a preferred embodiment, the first and second restricted flow passages include an orifice of no greater than about 0.020 inch in diameter. In another preferred embodiment, the first and second restricted flow passages each is sized to accommodate the leakage flow through the respective valve that exceeds the leakage flow through the respective fluid motor. In another preferred embodiment, the first and second restricted flow passages are sized to provide a leakage flow of about 0.12 gallons per minute.

In another preferred embodiment the restricted flow passage includes an orifice and a filter upstream of the orifice to prevent clogging of the orifice.

The system may further include the pump that provides pressurized fluid to the inlet of the first valve. The pump may be configured for mounting in the engine compartment of the snow-ice control vehicle and for being driven by an engine-driven fan belt in the compartment.

The invention also provides a snow-ice vehicle including the hydraulic drive system as well as the engine, wherein the engine has an engine-driven belt, and the pump is driven by the belt.

In still another preferred embodiment, the system is employed in combination with the auger and spinner that are connected to the first and second motors, respectively.

The invention also provides a corresponding method of operating the hydraulic drive system.

The foregoing and other features of the invention are hereinafter described in greater detail with reference to the accompanying drawings.

DETAILED DESCRIPTION

Figure 1:
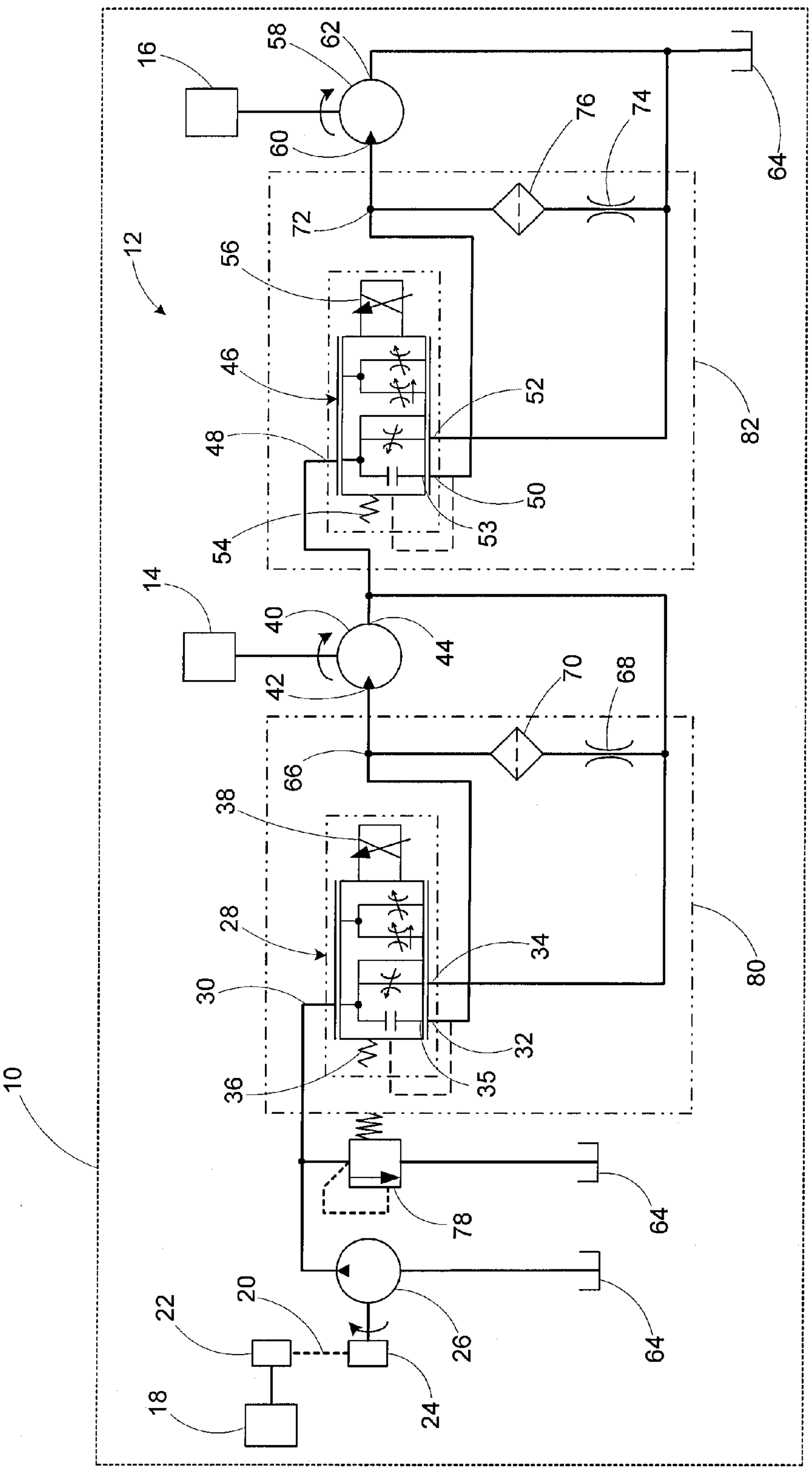
FIG. 1 is a schematic illustration of a snow-ice control vehicle including a hydraulic drive system for operating a feed auger and spinner in the snow-ice control vehicle in accordance with the invention.

Referring now to the drawings in detail, and initially to FIG. 1, a snow-ice control vehicle 10 includes a hydraulic system 12 for operating a feed auger 14 and spinner 16 of a spreader carried by the snow-ice control vehicle. The hydraulic system can be installed in various snow-ice control vehicles, such as a pickup dump truck, and allows pressure-compensated proportional control valves in series relationship to be operated from the cab of the vehicle to provide independent control of the feed auger 14 and spinner 16. Accordingly, the system can be used in combination with the snow-ice control vehicle 10, having an engine 18, wherein the engine 18 has an engine-driven belt 20 that in conjunction with pulleys 22 and 24, couples the engine 18 to a pump 26, thereby allowing the pump 26 to be driven by the belt 20. The pump 26 may be configured for mounting in an engine compartment of the snow-ice control vehicle 10 to allow the pump 26 to be driven off the engine 18.

The pump 26 supplies pressurized fluid to a solenoid-operated pressure-compensated proportional control valve 28 when driven by the engine 10. Pumps suitable for use as the pump 26 are conventionally available and often sold as kits with engine compartment mounting hardware. As is typical, the outlet of the pump may be provided with a pressure relief valve 78 to prevent damage to the system.

The solenoid-operated pressure-compensated proportional control valve 28, herein also referred to as an auger control valve, has an inlet 30, a regulated flow outlet 32, and a bypass flow outlet 34. The auger control valve 28 also includes an orifice spool 35 biased by a spool spring 36 toward its closed position, i.e. its position blocking flow from the inlet 30 to regulated flow outlet 32. As described further below, the valve has a compensator for compensating for pressure variations whereby the position of the orifice spool is a function of current applied to a solenoid 28 of the auger control valve. As energization of the solenoid 38 is increased, the orifice spool 35 will move a corresponding amount permitting flow of hydraulic fluid from the inlet 30 to the regulated flow outlet 32, while the balance of flow exits through the bypass flow outlet 34.

Accordingly, the inlet 30 receives pressurized fluid from the pump 26 (or other source), and the regulated flow outlet 32 controllably delivers the pressurized fluid to a fluid motor 40. The fluid motor 40, herein also referred to as the auger motor, includes a fluid inlet 42 connected to the regulated flow outlet 32 and a fluid outlet 44 connected to a solenoid-operated pressure-compensated proportional control valve 46, herein also referred to as a spinner control valve. Operation of the auger control valve 28 controls the volume of flow of pressurized fluid supplied to the inlet 42 of the auger motor 40 via the regulated flow outlet 32 with the balance of flow bypassing the auger motor 40 via the bypass flow outlet 34.

Upon receiving the pressurized fluid supplied by the regulated flow outlet 32, the auger motor 40 is configured to drive the feed auger 14 (or other device). When the fluid exits the auger motor 40 via the fluid outlet 44, it is combined with the fluid from the bypass flow outlet 34 to provide essentially all the fluid flow from the pump 26 to the spinner control valve 46. If an operator wishes to bypass the auger 14 (or other device), the pressurized fluid may be supplied to the spinner control valve 46 solely from the bypass flow outlet 34.

The spinner control valve 46 operates in manner similar to that described above in respect to the auger control valve 28 for controllably driving the spinner 16. The spinner control valve 46 has an inlet 48, a regulated flow outlet 50, and a bypass flow outlet 52. The spinner control valve 46 also includes an orifice spool 53 biased by a spool spring 54 toward its closed position, i.e. its position blocking flow from the inlet 48 to regulated flow outlet 50. The valve has a compensator for compensating for pressure variations whereby the position of the orifice spool is a function of current applied to a solenoid 56 of the auger control valve. As energization of the solenoid 56 is increased, the orifice spool 53 will move a corresponding amount permitting flow of hydraulic fluid from the inlet 48 to the regulated flow outlet 50, while the balance of flow exits through the bypass flow outlet 52.

Accordingly, the inlet 48 of the spinner control valve 46, which is connected to the outlet 44 of the auger motor 40 and the bypass flow outlet 34 of the auger control valve 28, receives the pressurized fluid from the outlet 44 and the bypass flow outlet 34, and the regulated flow outlet 50 controllably delivers the pressurized fluid to a fluid motor 58. The fluid motor 58, herein also referred to as the spinner motor, includes a fluid inlet 60 connected to the regulated flow outlet 50 and a fluid outlet 62 connected to a reservoir 64.

Operation of the spinner control valve 46 controls the volume of flow of pressurized fluid supplied to the inlet 60 of the spinner motor 58 via the regulated flow outlet 50 with the balance of flow bypassing the spinner motor 58 via the bypass flow outlet 52. Upon receiving the pressurized fluid supplied by the regulated flow outlet 50, the spinner motor 58 is configured to drive the spinner 16 (or other device). Fluid exiting the spinner motor 58 via the fluid outlet 62 is directed back to the reservoir 64 as is the fluid exiting the bypass flow outlet 52. If an operator wishes to bypass the spinner 16, the pressurized fluid may be returned to the reservoir 64 solely from the bypass flow outlet 52.

Pressure compensated valves, even when de-energized, have some leakage flow through the regulated flow outlets. The inventor recognized that this can result in pressure buildup at the inlet of the respective motor, particularly when the auger/spinner motor has low leakage. This is particularly a problem with new fluid motors when tolerances are very tight. As a result of this pressure buildup, the pressure compensated valves may not work properly and can result in pressure buildup at the outlet of the pump. To prevent pressure buildup at the regulated flow outlets of the valves, thereby assuring proper operation of the compensators, pressure relieving restricted flow passages 66 and 72 are connected, respectively, between the regulated flow outlets 32 and 50 and bypass flow outlets 34 and 52. The restricted flow passages 66 and 72 can each be sized to accommodate the difference between leakage flow through the regulated flow outlets 32 and 50 of the respective valves 28 and 46 and the respective fluid motor 40 and 58 when the valves 28 and 46 are de-energized and flow is directed to the bypass outlet.

The restricted flow passages 66 and 72 may include respective orifices 68 and 74 to restrict flow from the regulated flow outlets 32 and 50 to the bypass flow outlets 32 and 50. In one embodiment, the restricted flow passages 66 and 72 can have an orifice having a diameter no greater than about 0.020 inch and provide a leakage flow of about 0.12 gallons per minute. Additionally, the restricted flow passages 66 and 72 can include respective filters 70 and 76 upstream of the orifices 68 and 74 to help prevent clogging of the orifices 68 and 74.

The restricted flow passages 66 and 72 may be provided in a respective manifold block 80, 82 in which the valves are installed, as depicted by the broken lines in FIG. 1. The manifold blocks may be different or they may be the same. In the illustrated embodiment, the manifold blocks are the same. An exemplary manifold assembly 100, including the valves and orifices is illustrated in FIG. 2.

Figure 2:
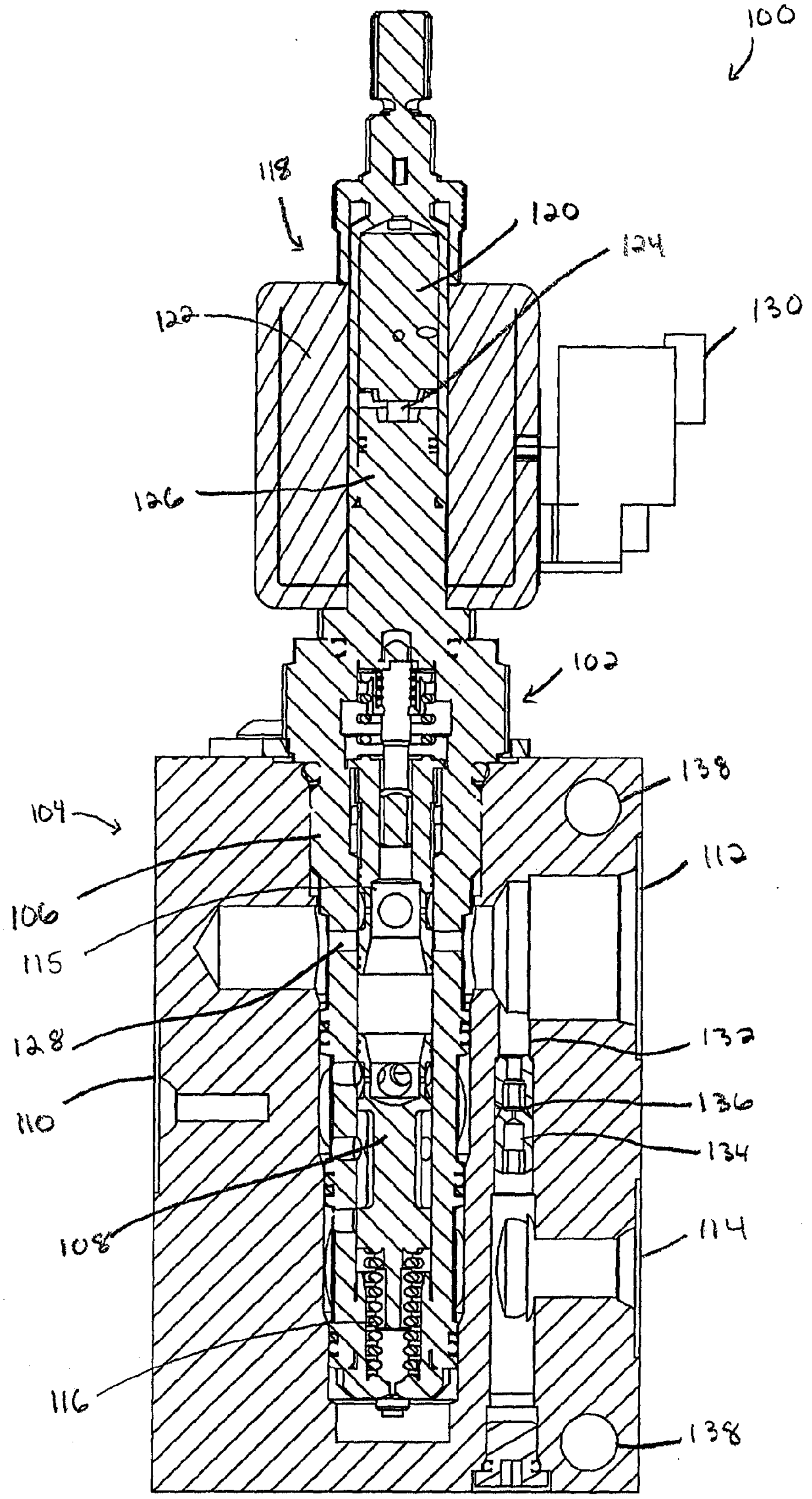
FIG. 2 is a cross-sectional view of an exemplary manifold assembly according to the invention.
Figure 3:
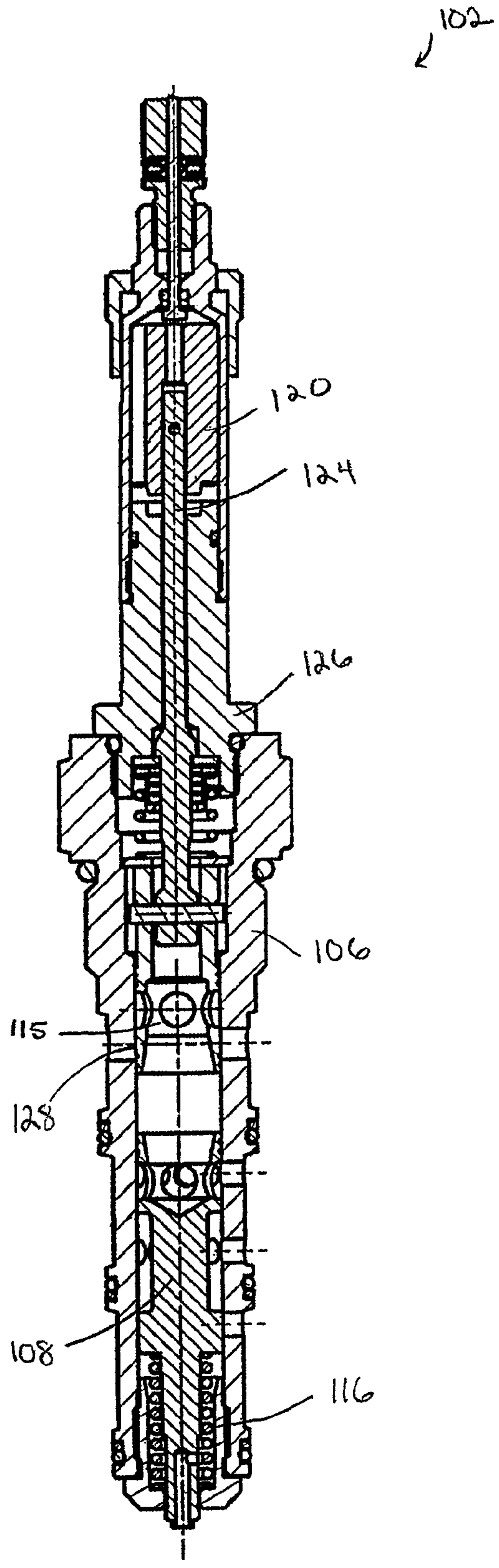
FIG. 3 is a cross-sectional view of a valve in the hydraulic drive system.

Turning now to FIGS. 2 and 3, the solenoid-operated pressure-compensated proportional control valve is indicated at 102 and is of a cartridge type threaded into the manifold block indicated generally as 104. The valve 102 may be of any suitable type, such as a valve available from Parker Hannifin Corporation under part number DFA125C31SN. As seen, the valve 102 has a valve body 106 having a central bore housing the valve components. The valve body 106 is threaded into the manifold 104 to secure the valve 102 in the manifold block 104. The valve 102 includes an inlet 110, a regulated flow outlet 112, and a bypass flow outlet 114 that are coupled to an inlet 111, a regulated flow outlet 113 and a bypass flow outlet 115 of the manifold 104, respectively. The valve 102 also includes a pressure compensating spool 108 that is biased by a spool spring 116, the compensating spool compensating for pressure variations in the valve. A sense port 123, which is connected by a sense line (as illustrated in FIG. 1) to the outlet 112 of the valve, allows the compensating spool 108 to sense the pressure on both ends of the spool 108 to compensate for the pressure variations in the valve.

The valve 102 additionally includes an orifice spool 117, which is biased by spool springs 119 and 121 toward its closed position, i.e. its position blocking flow from the inlet 110 to regulated flow outlet 112. A radial flow path 128 is provided between the inlet 110 and regulated flow outlet 112 that opens during axial movement of the orifice spool 117 to allow the fluid to flow from the inlet 110 to the regulated flow outlet 112.

A solenoid 118 is provided including a solenoid plunger 120 that is configured to be axially movable under the magnetic influence of a solenoid coil 122 toward and away from the orifice spool 117. The solenoid plunger 120 is coupled to a rod 124 and guided in a pole piece 126, thereby allowing the plunger 120 to move the orifice spool 117 a corresponding amount and permit fluid flow from the inlet 110 to the regulated flow outlet 112 when the solenoid 118 is energized. The position of the orifice spool 117 is a function of current applied to the solenoid 118 by a control device. The solenoid 118 is coupled to the control device by a coupling device 130, the control device preferably being located in the vehicle cab. The control device includes suitable controls that may be operated by the vehicle operator to vary the speed of the auger and spinner by varying the current supply to the auger control valve and spinner control valve. This may be implemented by a suitable microprocessor controller.

The manifold block 104 also has a flow passage 132 connected between the regulated flow outlet 113 and bypass flow outlet 115. The passage has disposed therein an orifice 134 and a filter 136 upstream the orifice, as described above. The restricted flow passage 132 can be sized to accommodate the difference between leakage flow through the valve 102 and the respective fluid motor when the valve is de-energized. To mount the manifold assembly 100 in different positions in the snow-ice vehicle 10, the assembly 100 includes mounting holes 138.

Although the auger is shown upstream of the spinner, it should be appreciated that the positions may be reversed.

Principles of the invention can be applied to other applications and thus, it should be appreciated that devices other than the auger or spinner may be driven by the fluid motors.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic system for operating a feed auger and spinner of a spreader, including:

first and second fluid motors for driving the feed auger and spinner, the first and second fluid motors having respective fluid inlets and outlets;

a first solenoid-operated pressure-compensated proportional control valve including a pressure compensating spool and having an inlet configured to receive pressurized fluid from a source thereof, a regulated flow outlet connected to the inlet of the first fluid motor, and a bypass flow outlet, whereby operation of the first valve controls the volume of flow of pressurized fluid supplied to the inlet of the first fluid motor via the regulated flow outlet with the balance of flow bypassing the first fluid motor;

a second solenoid-operated pressure-compensated proportional control valve including a pressure compensating spool and having an inlet connected to the outlet of the first fluid motor and the bypass flow outlet of the first valve, a regulated flow outlet connected to the inlet of the second fluid motor, and a bypass flow outlet, whereby operation of the second valve controls the volume of flow of pressurized fluid supplied to the inlet of the second fluid motor via the regulated flow outlet of the second valve with the balance of flow bypassing the second fluid motor; and first and second pressure-relieving restricted flow passages respectively connected between the regulated flow outlets and bypass flow outlets of the first and second valves for preventing pressure buildup at the regulated flow outlets of the first and second valves, thereby to assure proper operation of the compensator spools of the first and second valves.

2. A hydraulic system as set forth in claim 1, wherein the first and second restricted flow passages include an orifice of no greater than about 0.020 inch in diameter.

3. A hydraulic system as set forth in claim 1, wherein the first and second restricted flow passages each is sized to accommodate the difference between leakage flow through the respective valve and the respective fluid motor.

4. A hydraulic system as set forth in claim 1, wherein the first and second restricted flow passages are sized to provide a leakage flow of about 0.12 gallons per minute.

5. A hydraulic system as set forth in claim 1, wherein the first and second restricted flow passages include an orifice of no greater than about 0.020 inch in diameter, and wherein the first and second restricted flow passages each is sized to accommodate the difference between leakage flow through the respective valve and the respective fluid motor.

6. A hydraulic system as set forth in claim 1, wherein the first and second restricted flow passages include an orifice of no greater than about 0.020 inch in diameter, and wherein the first and second restricted flow passages are sized to provide a leakage flow of about 0.12 gallons per minute.

7. A hydraulic system as set forth in claim 1, wherein the first and second restricted flow passages each is sized to accommodate the difference between leakage flow through the respective valve and the respective fluid motor, and wherein the first and second restricted flow passages are sized to provide a leakage flow of about 0.12 gallons per minute.

8. A hydraulic system as set forth in claim 1, wherein the restricted flow passage includes an orifice and a filter upstream of the orifice to prevent clogging of the orifice.

9. A hydraulic system as set forth in claim 1, further comprising a pump for providing pressurized fluid to the inlet of the first valve.

10. A hydraulic system as set forth in claim 9, wherein the pump is configured for mounting in the engine compartment of a snow-ice control vehicle for being driven off the engine.

11. A hydraulic system as set forth in claim 10, in combination with the snow-ice vehicle, and wherein the vehicle includes an engine having an engine-driven belt, and the pump is driven by the belt.

12. A hydraulic system as set forth in claim 1, in combination with the auger and spinner.

13. A method of operating a spreader assembly in a snow-ice control vehicle including an engine for effecting movement of the vehicle along a road, the spreader assembly including a pump, first and second fluid motors for driving a feed auger and spinner, respectively, and first and second solenoid-operated pressure-compensated proportional control valves, wherein each valve includes an inlet, a regulated flow outlet, and a bypass flow outlet, the method including:

driving the pump off the engine of the snow-ice control vehicle;

supplying pressurized fluid from the pump to the first valve;

controlling the feed auger using the first valve, wherein the fluid is supplied from the first valve to the first motor via the regulated flow outlet of the first valve;

supplying the fluid from the bypass flow outlet of the first valve and an outlet of the first motor to the second valve;

controlling the spinner using the second valve, wherein the fluid is supplied from the second valve to the second motor via the regulated flow outlet of the second valve;

supplying the fluid from the bypass flow outlet of the second valve and an outlet of the second motor to a reservoir; and using first and second pressure-relieving restricted flow passages respectively connected between the regulated flow outlets and bypass flow outlets of the first and second valves to prevent pressure buildup at the regulated flow outlets of the first and second valves, thereby to assure proper operation of the compensator spools of the first and second valves.

14. A method as set forth in claim 13, wherein the first and second restricted flow passages include an orifice of no greater than about 0.020 inch in diameter.

15. A method as set forth in claim 13, wherein the first and second restricted flow passages each is sized to accommodate the difference between leakage flow through the respective valve and the respective fluid motor.

16. A method as set forth in claim 13, wherein the first and second restricted flow passages include an orifice of no greater than about 0.020 inch in diameter, and wherein the first and second restricted flow passages each is sized to accommodate the difference between leakage flow through the respective valve and the respective fluid motor.

17. A method as set forth in claim 13, wherein the first and second restricted flow passages are sized to provide a leakage flow of about 0.12 gallons per minute.

18. A method as set forth in claim 13, wherein the restricted flow passage includes an orifice and a filter upstream of the orifice to prevent clogging of the orifice.

19. A method as set forth in claim 13, wherein the first and second restricted flow passages include an orifice of no greater than about 0.020 inch in diameter, and wherein the first and second restricted flow passages are sized to provide a leakage flow of about 0.12 gallons per minute.

20. A method as set forth in claim 13, wherein the first and second restricted flow passages each is sized to accommodate the difference between leakage flow through the respective valve and the respective fluid motor, and wherein the first and second restricted flow passages are sized to provide a leakage flow of about 0.12 gallons per minute.

* * * * *